Patented Sept. 15, 1925.

1,553,634

UNITED STATES PATENT OFFICE.

DAMON F. SAWYER, OF PAWNEE, OKLAHOMA, ASSIGNOR TO PAUL MENAUL, OF STILL-WATER, OKLAHOMA.

PROCESS FOR PREPARING COTTON SEED MEAL FOR USE AS A FEEDSTUFF.

No Drawing.    Application filed November 20, 1924. Serial No. 751,169.

*To all whom it may concern:*

Be it known that I, DAMON F. SAWYER, a citizen of the United States of America, residing at Pawnee, in the county of Pawnee and State of Oklahoma, have invented certain new and useful Improvements in Processes for Preparing Cotton Seed Meal for Use as a Feedstuff, of which the following is a specification.

The invention relates to a process of preparing cotton seed meal for use as a feedstuff and has for its object to destroy the toxic properties possessed by cottonseed meal as ordinarily prepared, which render it unfit as a feedstuff for certain kinds of live stock.

I am aware that it has heretofore been proposed to eliminate these toxic properties by treating the meal with calcium chloride, but such a process possesses the disadvantage of incorporating foreign material in the final product, whereas in my product no such foreign substance is present.

According to my process the crushed cottonseed, either before or after the oil is pressed out, but preferably after the removal of the oil, is treated to the action of air or oxygen at a high temperature, preferably at a temperature of 100° C. or more, while the meal is in a moist condition.

At the beginning of the operation the physical condition of the cotton seed product should be a fine meal, or what is generally known as cotton seed meal. To this meal is added water in weight from one-fourth to one-half the weight of the dry meal, one third being the optimum amount. The water and meal are then thoroughly mixed mechanically.

If desired the water may be supplied by introducing steam into the dry meal until the meal has condensed from one-fourth to one-half its dry weight of water. The steam also serves to thoroughly mix the meal and water, and to thoroughly penetrate the entire mass.

The meal is now in a slightly moist condition, yet light, porous and spongy. In this condition it contains sufficient air or oxygen for the reaction as set forth in this process. The moist meal is then heated or cooked with steam or other means at about 100° C., preferably for about two hours. This temperature and time are found to be most favorable in carrying out my process though somewhat higher temperatures may be used if desired in which case the length of time of cooking should be reduced. For example, where a temperature of 125° C. is employed the required time is about one-half hour.

During the heating process the cotton seed meal turns darker, even to a very dark brown. This is an indication that the toxic principle has been destroyed.

The meal treated by the foregoing process may be dried to the moisture content of what is commonly known as cotton seed meal, containing eight percent to ten percent of water. In this condition it is adapted for use as a feedstuff and possesses no toxic properties.

I have found that the poisonous or toxic substance in the cotton seed is destroyed by the process herein described, and that the cotton seed product so treated possesses marked advantages over ordinary cotton seed products, such as being non-toxic, possessing an increased food value, and its use does not give rise to objectionable after effects.

I am aware that certain processes of removing oil from cotton seed have been devised in which the cotton seed is cooked under steam pressure for the purpose of removing the oil, but I do not claim this as my invention. What I do regard as my invention and desire to secure by Letters Patent is set forth in the appended claims.

The temperature may under certain conditions be reduced to 90° without departing from the spirit of the invention provided the length of the cooking period is likewise extended. Other changes in the process may be made which fall within the scope of the claims.

For example, I found that under certain conditions it is not necessary in this process that the cottonseed shall be ground to a meal, but that if water to one third the weight is added to the whole cottonseed and then heated to 100° C. or higher this toxic principle is destroyed.

What I claim is:

1. A process of rendering cottonseed meal nontoxic when used as a feed stuff which consists in adding to crushed cottonseed meal a substantial quantity of water, and heating said meal while in the moist condition until the meal assumes a darker color indicating that the toxicity has been reduced.

2. A process of rendering cotton seed meal nontoxic when used as a feedstuff which consists in mixing crushed cottonseed with from one-fourth to one-half its dry weight of water, then heating the meal while in the moist condition to a temperature of about 100° C., said temperature being maintained until the cottonseed meal turns darker, indicating that the toxic principle has been destroyed.

3. A process of treating cotton seed meal to render it non-toxic when used as a feedstuff, which consists in adding to crushed cotton seed from which the oil has been removed, approximately one-third its dry weight of water, thoroughly mixing the meal and water to render the meal porous and spongy, then heating the moist meal until the cotton seed meal assumes a dark color, indicating that the toxic principle has been destroyed, then drying the product to a moisture content of approximately ten percent water.

4. A process rendering cotton seed meal non-toxic when used as a feedstuff, which consists in subjecting the meal to a reaction, which is brought about by cooking the meal; moistened with approximately one-third its dry weight of water, until the meal assumes a dark color, indicating that the toxic principle has been destroyed.

In testimony whereof I affix my signature.

DAMON F. SAWYER.